(12) United States Patent
Viswanath et al.

(10) Patent No.: US 10,961,052 B2
(45) Date of Patent: Mar. 30, 2021

(54) AUTOMATED WAREHOUSE

(71) Applicant: Chaldal, Inc., Burlingame, CA (US)

(72) Inventors: Tejas Viswanath, Foster City, CA (US); Waseem Alim, Dacca (BD)

(73) Assignee: CHALDAL, INC., Burlingame, CA (US)

( * ) Notice: Subject to any disclaimer, the term of this patent is extended or adjusted under 35 U.S.C. 154(b) by 24 days.

(21) Appl. No.: 16/559,585

(22) Filed: Sep. 3, 2019

(65) Prior Publication Data

US 2020/0079589 A1  Mar. 12, 2020

Related U.S. Application Data

(60) Provisional application No. 62/727,557, filed on Sep. 6, 2018.

(51) Int. Cl.
*B65G 1/04* (2006.01)
*B65G 1/12* (2006.01)

(52) U.S. Cl.
CPC ............. *B65G 1/0492* (2013.01); *B65G 1/12* (2013.01)

(58) Field of Classification Search
CPC combination set(s) only.
See application file for complete search history.

(56) References Cited

U.S. PATENT DOCUMENTS

| | | | |
|---|---|---|---|
| 8,006,824 B2 * | 8/2011 | Wada | B65G 61/00 198/347.1 |
| 8,180,483 B2 * | 5/2012 | Wada | B65G 1/137 700/214 |
| 2004/0265097 A1 * | 12/2004 | Kim | B29D 30/0061 414/286 |
| 2010/0277341 A1 * | 11/2010 | Abraham | H04Q 9/00 340/870.01 |
| 2013/0147634 A1 * | 6/2013 | Abraham | E04H 5/02 340/870.02 |
| 2016/0272469 A1 * | 9/2016 | Carroll | G06Q 10/06395 |
| 2018/0312336 A1 * | 11/2018 | Wagner | B65G 1/1373 |

* cited by examiner

*Primary Examiner* — Kyle O Logan
(74) *Attorney, Agent, or Firm* — Cognition IP, P.C.; Edward Steakley; Aroon Karuna

(57) ABSTRACT

An automated warehouse is disclosed comprising an enclosure. A robotic arm mounted above the enclosure places packages in the enclosure and removes packages from the enclosure. In embodiments, packages may be packed tightly within the enclosure to improve storage efficiency within the enclosure.

20 Claims, 6 Drawing Sheets

AUTOMATED WAREHOUSE

CROSS-REFERENCE TO RELATED APPLICATION

This application claims the benefit of U.S. Provisional Application No. 62/727,557, filed on Sep. 6, 2018, which is hereby incorporated by reference in its entirety.

BACKGROUND

A warehouse may be used to store items or packages for commercial or other purposes. In some warehouses, packages are placed on rows of shelves with aisles in between the shelves.

SUMMARY

Disclosed herein are embodiments directed to an automated warehouse and methods of manipulating packages using an automated warehouse. In various embodiments, automated manipulation of packages within a warehouse or storage room may be used to pack items more densely than would otherwise be possible. Rather than using shelves or dividers within the storage room, packages may be placed tightly within the storage room in an optimal pattern to maximize storage density for a given volume.

Some embodiments relate to methods for manipulating a package. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect of some embodiments includes providing a package at a first location outside of a storage room that is enclosed and open on a top. An exemplary method may include maneuvering a robotic arm to the first location. The method also includes engaging the package with a package engagement mechanism mounted on the robotic arm. The method also includes determining a second location within the storage room; maneuvering the robotic arm to the second location; releasing the package at the second location; recording the second location in a memory; receiving a request for the package; recalling from the memory the second location in the storage room; maneuvering the robotic arm to the second location in the storage room; identifying, by a camera mounted on the robotic arm, a feature of the package; determining a third location of the package based on the feature; maneuvering the robotic arm to the third location; engaging the package with the package engagement mechanism mounted on the robotic arm; maneuvering the robotic arm to a fourth location outside of the storage room. The method also includes releasing the package at the fourth location. Other embodiments of this aspect include corresponding computer systems, apparatus, and computer programs recorded on one or more computer storage devices, each configured to perform the actions of the methods.

Implementations may include one or more of the following features. The method where determining a second location within the storage room may include: determining a second location based at least in part on a dimension of the package. The method where the dimension of the package is determined by acquiring an image of the package with the camera and estimating the dimension of the package based on the image. The method where determining a second location within the storage room may include: determining a second location based at least in part on a weight of the package. The method where determining a second location within the storage room may include: comparing a load-bearing capability of a second package beneath the second location with an estimated weight of the package; and determining that the second package can bear the load of the package based on the comparing. The method where determining a second location within the storage room may include: receiving an estimated height, width, and depth of the package; and comparing the estimated height, width, and depth of the package with a three-dimensional map of the storage room. The method may further include, prior to releasing the package at the second location: rotating the package to fit in the second location. The method where determining a second location within the storage room may include: moving, with the robotic arm, a third package within the storage room to create a space for the package. Implementations of the described techniques may include hardware, a method or process, or computer software on a computer-accessible medium.

Some embodiments relate to an automated warehouse, including: a rectangular cuboid enclosure with no human-accessible entrances, the enclosure open on a top side; a gantry mounted above the top side of the rectangular cuboid enclosure, the gantry moveable in a horizontal plane above the rectangular cuboid enclosure; an extendable arm movably attached to the gantry, the extendable arm extendable in a vertical direction; a package engagement mechanism mounted to an end of the extendable arm. The automated warehouse also includes a computer vision module attached to the end of the extendable arm. The automated warehouse also includes a warehouse controller having a memory. The automated warehouse also includes where the warehouse controller is configured to control the gantry, extendable arm, and package engagement mechanism to move a package from outside of the rectangular cuboid enclosure, place the package within the rectangular cuboid enclosure, and record in the memory the location of the package within the rectangular cuboid enclosure. Other embodiments of this aspect include corresponding computer systems, apparatus, and computer programs recorded on one or more computer storage devices, each configured to perform the actions of the methods.

Implementations may include one or more of the following features. The automated warehouse where the package engagement mechanism is capable of rotating in at least one rotational dimension. The automated warehouse where the package engagement mechanism uses at least one suction cup and negative pressure to engage packages. The automated warehouse further including: a second extendable arm movably attached to the gantry, the second extendable arm extendable in a vertical direction; a second package engagement mechanism mounted to the end of the second extendable arm. The automated warehouse may also include a second computer vision module attached to the end of the second extendable arm. Implementations of the described techniques may include hardware, a method or process, or computer software on a computer-accessible medium.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

The present disclosure will become more fully understood from the detailed description and the accompanying drawings, wherein.

DETAILED DESCRIPTION

Figure 1A:
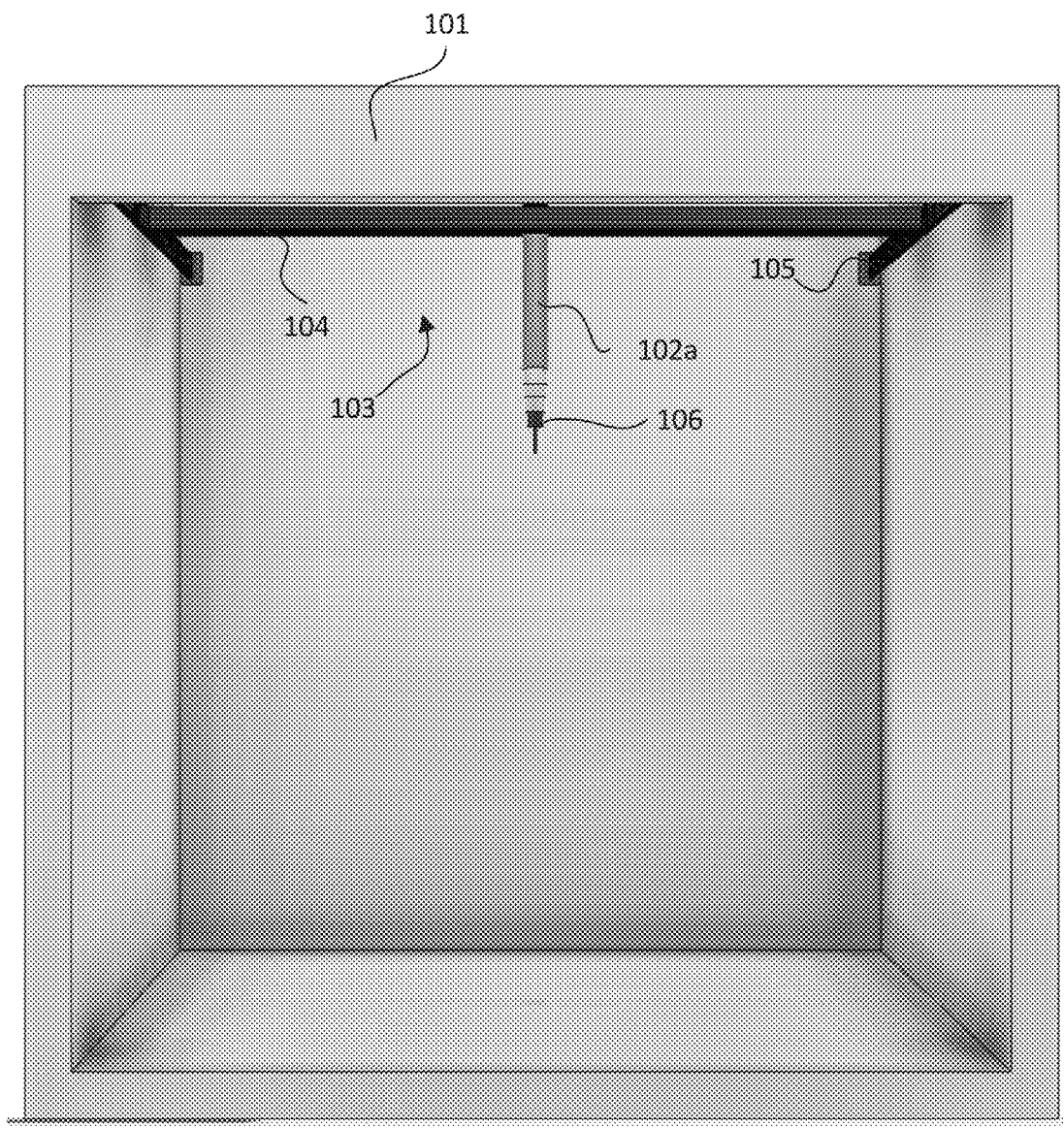
FIGS. 1A-B illustrate a side view of a storage room with an automated package handling system according to an embodiment.
Figure 1B:
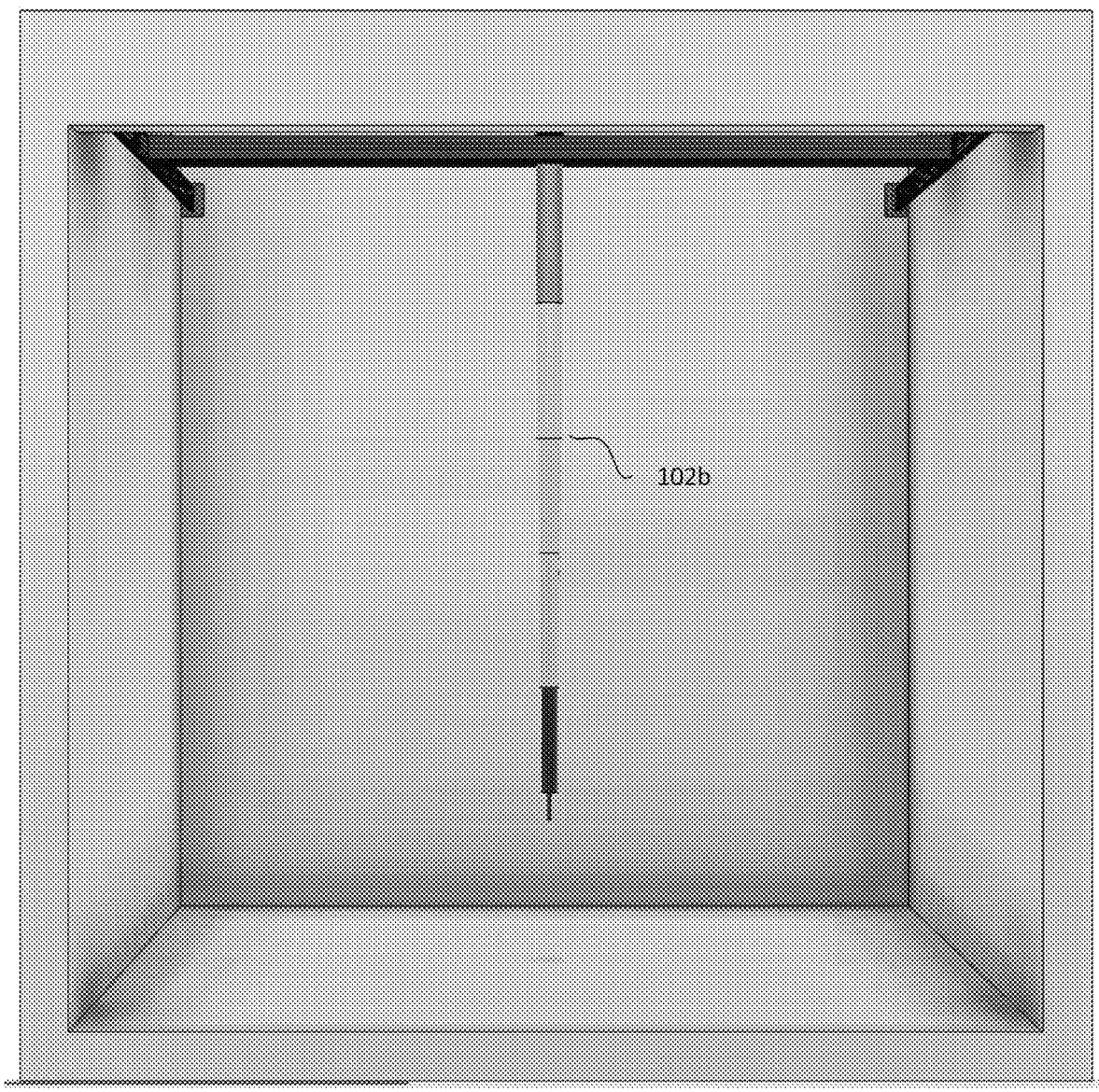

FIGS. 1A-B illustrate a side view of a storage room with an automated package handling system according to an embodiment. In this illustration, a wall of the storage room has been omitted to illustrate components behind the wall. In some embodiments, a storage room may optionally have no human-accessible entryways such that the interior room cannot be accessed by a human from the outside. In an example, storage room 101 is five meters cubed, that is, it is five meters in height, five meters in width, and five meters in length. In another example, storage room 101 is four meters in height, eight meters in width, and eight meters in length. In some other example embodiments, storage room 101 may be from 1-10 meters in height, 1-10 meters in width, and 1-10 meters in length, for example.

Within storage room 101, robotic arm 102 is mounted on gantry 103. Gantry 103 comprises a first linear actuator 104 that moves robotic arm 102 in a first axis and a second linear actuator 105 that moves robotic arm 102 in a second axis orthogonal to the first axis. In an example, the first axis may be referred to as the 'X' axis and the second axis may be referred to as the 'Y' axis. The gantry 103 is mounted at the top of storage room 101 which is open on the top side. In an embodiment, gantry 103 allows travel in the X and Y axis such that the robotic arm may travel the entire length and width of the storage room 101.

In an embodiment, gantry 103 may include servo-driven belts that move a vehicle in a track to manipulate the X and Y axis. In some embodiments, gantry 103 may include screw-driven linear actuators which manipulate the X and Y axis.

Robotic arm 102 is movable in a vertical axis orthogonal to the first and second axis. In an example, the vertical axis may be referred to as the 'Z' axis. FIG. 1A illustrates the robotic arm 102a in a retracted state, and FIG. 1B illustrates the robotic arm 102b in an extended state. In general, robotic arm 102 may extend along the Z-axis the entire height of the storage room 101.

In an embodiment, robotic arm 102 includes a telescoping linear actuator which moves the robotic arm up and down along the Z axis (see 102a and 102b). In some embodiments, robotic arm 102 includes a rope and pulley system which lowers and lifts the robotic arm head 105 along the Z axis.

The X and Y axis travel of gantry 103 combined with the Z axis travel of robotic arm 102 enables the robotic arm head 105 to be placed at any three-dimensional point within storage room 101. In some embodiments, gantry 103 also enables the robotic arm 102 to be movable to one or more locations outside of storage room 101. For example, gantry 103 may enable travel outside of storage room 101 to a package receiving area and a package delivery area.

Robotic arm head 105 includes a package engagement mechanism 106 to selectively engage and disengage packages. In an embodiment, the package engagement mechanism may be a suction-driven mechanism using one or more suction cups and negative air pressure to engage or grab packages. A suction generator may be remotely located from the robotic arm head 105 and deliver negative air pressure to the robotic arm head 105 through a series of tubes or channels. When suction is turned on, the example engagement mechanism draws packages to the one or more suction cups which adheres the package to the engagement mechanism. When suction is removed or turned off, the packages are released from the example engagement mechanism.

In an embodiment, engagement mechanism 106 may be comprised of a set of grasping mechanisms which engage packages by friction derived from mechanical pressure applied to package. For example, a set of two opposed grasping mechanism may be used which move toward each other to exert mechanical force on a package to engage the package. When the grasping mechanisms are moved further away from each other, the package is released.

In other embodiments, engagement mechanism 106 may be comprised of a magnet that is selectively actuatable, exerting magnetic force to engage packages and removing magnetic force to release packages. In yet other embodiments, engagement mechanism 106 may be comprised of hooks or other specialized mechanical apparatus that are configured to interact with corresponding mechanisms on packages.

While one robotic arm 102 is pictured in the example illustrated in FIG. 1, in some embodiments a plurality of robotic arms may operate in a storage room at the same time. In some embodiments, the plurality of robotic arms may share some gantry or actuating components, and in other embodiments the plurality of robotic arms may not share any components. In some embodiments, each of a plurality of robotic arms may be limited to a subdivision of a storage room, and in other embodiments, each of a plurality of robotic arms may each be capable of maneuvering throughout the entirety of a storage room.

Figure 2A:
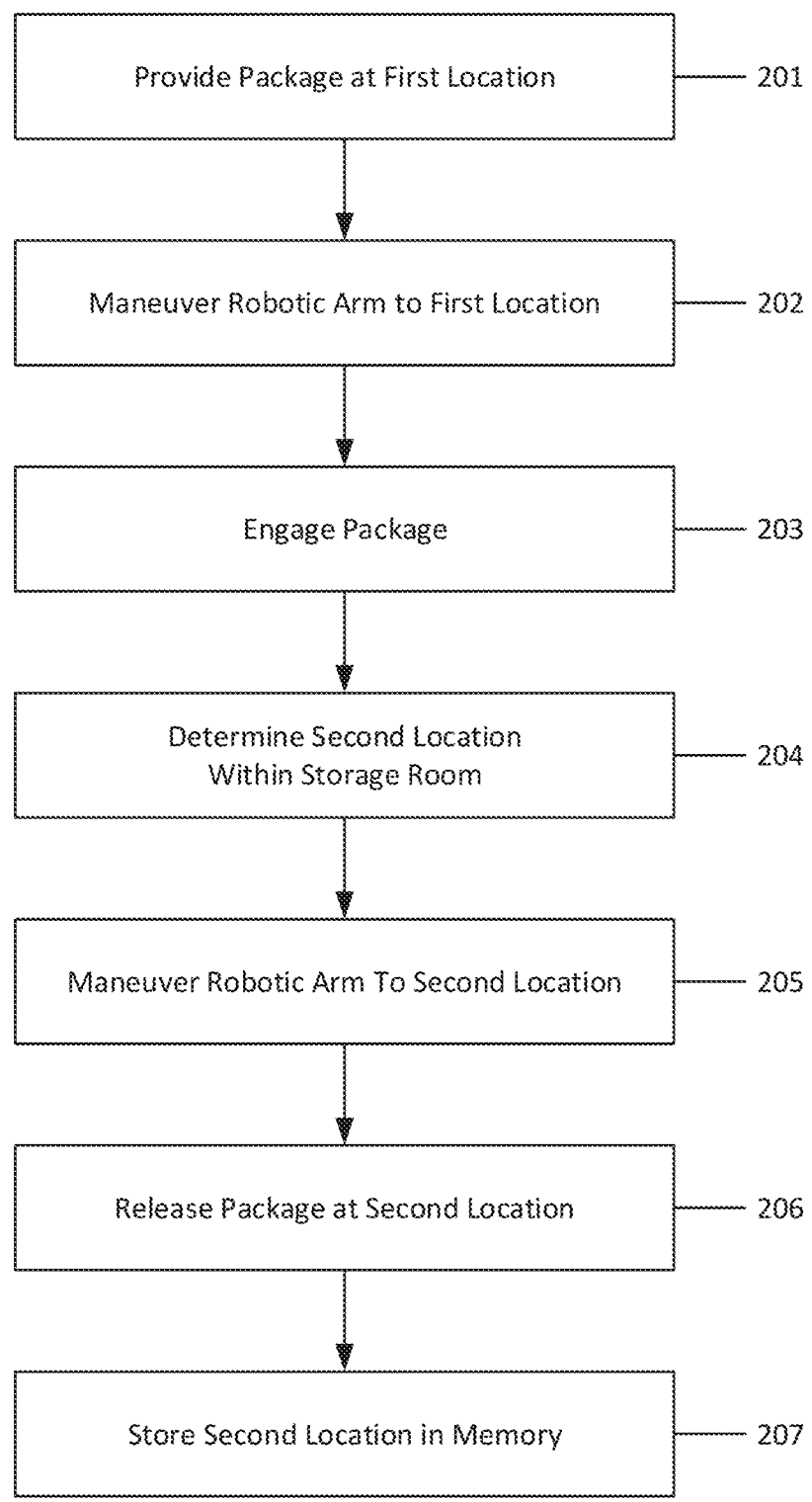
FIGS. 2A-2C illustrate the steps of a method for package management according to an embodiment.
Figure 2B:
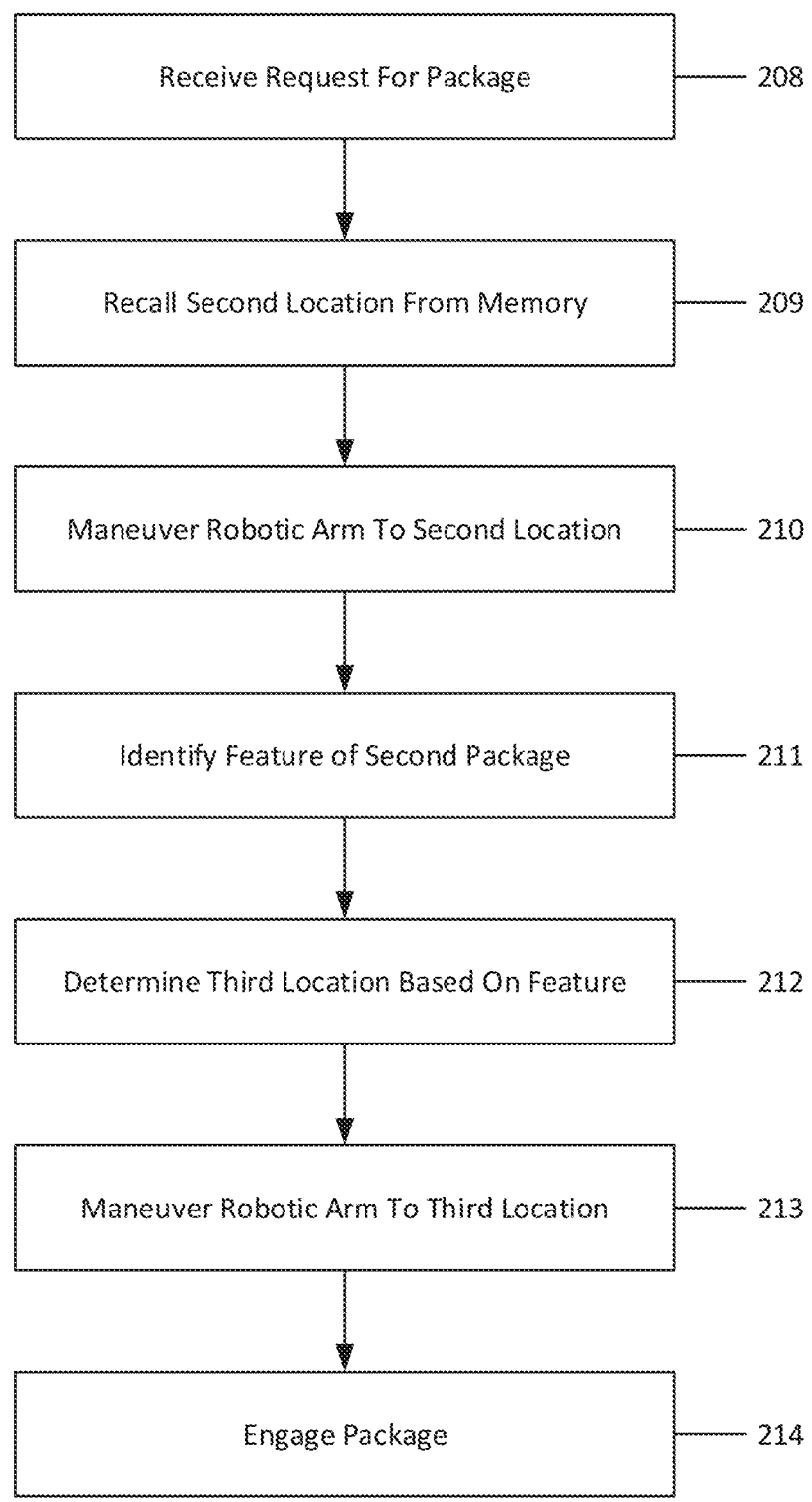
Figure 2C:
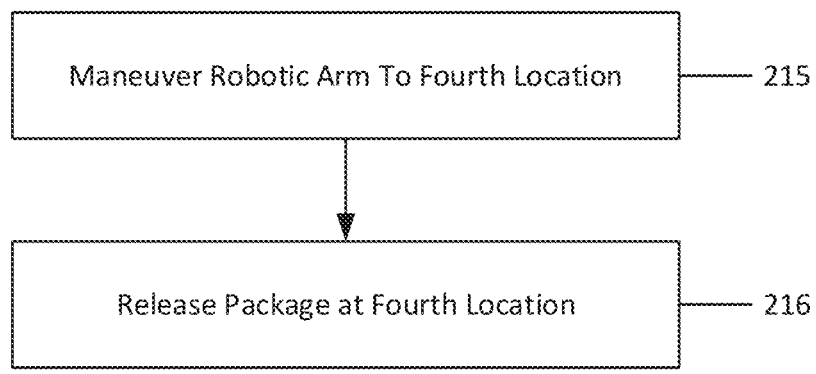

FIGS. 2A-2C illustrate the steps of a method for package management according to an embodiment. At step 201, a package is provided at a first location outside of a storage room. The storage room may optionally be a rectangular cuboid that is enclosed on all sides, open on the top, and has no human-accessible entrances. The storage room may be a storage room such as described in connection with FIG. 1, for example. The storage room may be of any shape such as prismatic, polyhedral, spherical, or ellipsoidal. In some embodiments, a portion of one or more walls of the storage room are transparent or translucent to allow viewing the inside of the storage room. The first location may be a package receiving area where packages are received for placement in the storage room. A robotic arm is maneuvered to the first location at step 202. In some embodiments, the robotic arm may be maneuvered by a two-axis gantry located above the open top of the storage room. In other embodiments, the robotic arm may be maneuvered by other means such as a multi-segment articulated arm with rotary joints.

Next, at step 203, an engagement mechanism mounted to an end of the robotic arm engages the package. In some embodiments, the engagement mechanism may comprise a suction mechanism that uses negative air pressure to draw the package to the engagement mechanism. A suction-based engagement mechanism may further comprise one or more suction cups to engage with the package. In some embodiments, the engagement mechanism may comprise one or more gripper or grasping mechanisms for grabbing or holding a package.

At step 204, a second location within the storage room is determined for the package. In some embodiments, the size or dimensions of the package may be received from an external source such as a product or package information database. In some embodiments, the size or dimensions of the package may be determined or estimated from a measurement device attached to the robotic arm. For example, a camera attached to the robotic arm may image the package and a computer vision module may estimate the dimensions of the package based on the image. The computer vision module may be, for example, a camera, optical sensor, or other computer vision hardware. In addition, a weight of the package may be received from an external source such as a product or package information database or received from a scale or other measurement device.

In an example, the second location may be any location with sufficient space or volume for the package. The size or dimensions of the package may be compared to a three-dimensional map of the interior space of the storage room to determine an available space or volume for the package. The storage room may have other packages in it already, and the second location may be on top of one or more other packages.

In some embodiments, the second location may require manipulation of the package to fit in the second location, such as rotating or inverting the package. The second location may be selected based on an optimization of the internal space of the storage room to minimize unused space, or for other priorities such as ease of retrieval. For example, a package may be placed at a second location that is not optimal for storage density but is easily accessible for quick retrieval if it is expected that the package will need to be easily accessed. In some examples, other packages already in the storage room may be moved to create a space for the package.

A weight of the package may be used in determining the second location. For example, a weight of the package may be compared to a load-bearing capability of a package below the second location to ensure that the addition of the package will not crush any packages below the second location. The effect of the addition of the package on all other packages in the storage room may be estimated as a part of determining the second location. For example, if two other packages share a load of the second location, the effect of the additional weight proportionally distributed across both packages may be estimated and compared to the load-bearing capability of both packages.

At step 205, after the second location is determined, the robotic arm is maneuvered to the second location, transporting the package to the second location. If any rotation or other manipulation of the package is required, the robotic arm rotates or manipulates the package in maneuvering to the second location. At step 206, the engagement mechanism disengages with the package, placing it at the second location. In embodiments using a suction-based engagement mechanism, disengaging with the package may include removing suction or negative air pressure from the engagement mechanism, releasing the package. In embodiments using a gripper-based engagement mechanism, disengaging with the package may include widening a gripper to release the package.

At step 207, the second location is recorded in a memory such as a three-dimensional map or model of the internal space of the storage room. This three-dimensional map may then be used for later placement of additional packages or for identifying the location of any package for retrieval. For example, at step 208, a request for the package is received, and at step 209 the second location corresponding to the package is recalled from memory.

At step 210, the robotic arm is maneuvered to the second location in the storage room. In some examples, other packages may be occluding or obstructing access to the second location. If necessary, the robotic arm may move other packages to access the second location.

As the robotic arm approaches the second location, at step 211 a camera mounted on the robotic arm may image the package to locate a feature of the package. For example, a feature of the package may be an edge of the package, a graphic identifying the package, or a machine-readable identifies such as a one or two-dimensional bar code. The location of the feature may be used at step 212 to determine a third location of the package based on the feature. For example, the precise location of the package may have shifted slightly since the package was placed at the second location, and the precise location of the feature identified in step 211 may be used to determine an updated third location of the package. If a significant departure from the expected location of the package is detected, an alarm may be transmitted to signal a need for intervention. For example, if the expected package is not imaged at the second location, the internal three-dimensional map of the storage room may be significantly out of sync with the actual state of the storage room, and outside intervention necessary. At step 213, the robotic arm is maneuvered to the third location, and the engagement mechanism engages with the package at step 214.

At step 215, the robotic arm is maneuvered to a fourth location outside of the storage room such as a package delivery preparation area, and at step 216 the package is released at the fourth location. The fourth location may be the same location as the first location in some embodiments, such that the robotic arm loads and unloads packages to and from the storage room from the same location.

In some embodiments, the robotic arm may rebalance or readjust the locations of packages preemptively. For example, the robotic arm may move items at night time or times of lesser delivery activity to facilitate quicker access to more important items the next day. Times of lesser activity may be determined by tracking historical activity or predicting activity using statistical methods or an artificial intelligence system or algorithm. Similarly, the robotic arm may move items around in the storage room to move heavier items towards the bottom, leaving lighter items on top so as to reduce the load on certain packages. In this way, the automated warehouse may receive packages in any order as necessary and optimize location and placement of packages at a later time to improve efficiency in accessing packages.

Figure 3:
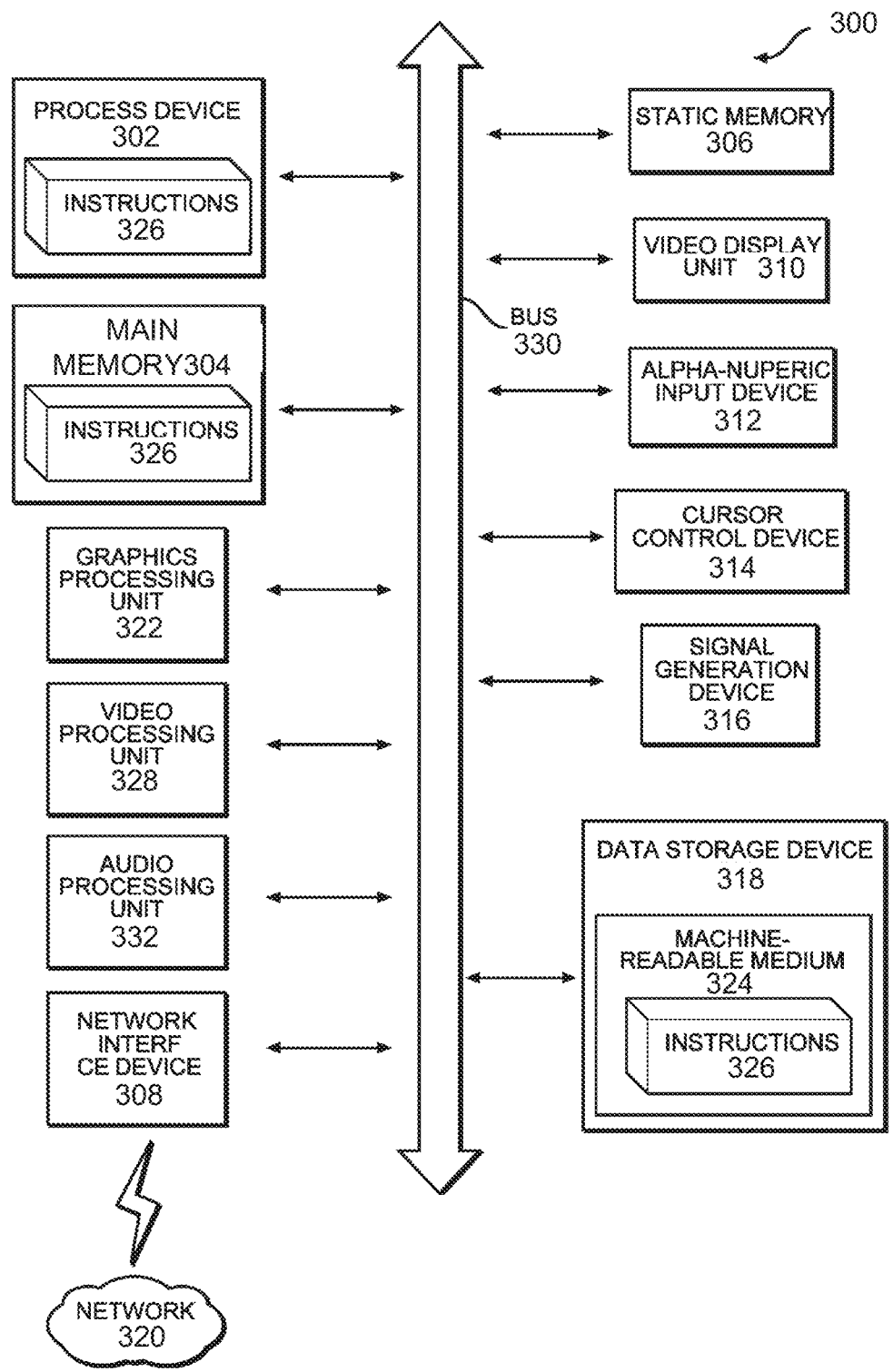
FIG. 3 illustrates an example machine of a computer system within which a set of instructions, for causing the machine to perform any one or more of the methodologies discussed herein, may be executed.

FIG. 3 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein.

The computer system 300 may further include a network interface device 308 to communicate over the network 320. The computer system 300 also may include a video display unit 310 (e.g., a liquid crystal display (LCD) or a cathode ray tube (CRT)), an alphanumeric input device 312 (e.g., a keyboard), a cursor control device 315 (e.g., a mouse), a graphics processing unit 322, a signal generation device 316 (e.g., a speaker), graphics processing unit 322, video processing unit 328, and audio processing unit 332.

The data storage device 318 may include a machine-readable storage medium 324 (also known as a computer-readable medium) on which is stored one or more sets of instructions or software 326 embodying any one or more of the methodologies or functions described herein. The instructions 326 may also reside, completely or at least partially, within the main memory 304 and/or within the processing device 302 during execution thereof by the computer system 300, the main memory 304 and the processing device 302 also constituting machine-readable storage media.

In one implementation, the instructions 326 include instructions to implement functionality corresponding to the components of a device to perform the disclosure herein. While the machine-readable storage medium 324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for manipulating a package, comprising:
providing a package at a first location outside of a storage room that is enclosed on all sides and open on a top;
maneuvering a robotic arm to the first location;
engaging the package with a package engagement mechanism mounted on the robotic arm;
determining a second location within the storage room;
maneuvering the robotic arm to the second location;
releasing the package at the second location;
recording the second location in a memory;
receiving a request for the package;
recalling from the memory the second location in the storage room;
maneuvering the robotic arm to the second location in the storage room;
identifying, by a camera mounted on the robotic arm, a feature of the package;
determining a third location of the package based on the feature;
maneuvering the robotic arm to the third location;
engaging the package with the package engagement mechanism mounted on the robotic arm;
maneuvering the robotic arm to a fourth location outside of the storage room; and
releasing the package at the fourth location.

2. The method of claim 1, wherein determining a second location within the storage room comprises:
determining a second location based at least in part on a dimension of the package.

3. The method of claim 2, wherein the dimension of the package is determined by acquiring an image of the package with the camera and estimating the dimension of the package based on the image.

4. The method of claim 1, wherein determining a second location within the storage room comprises:
determining a second location based at least in part on a weight of the package.

5. The method of claim 1, wherein determining a second location within the storage room comprises:
comparing a load-bearing capability of a second package beneath the second location with an estimated weight of the package; and
determining that the second package can bear the load of the package based on the comparing.

6. The method of claim 1, wherein determining a second location within the storage room comprises:
receiving an estimated height, width, and depth of the package; and
comparing the estimated height, width, and depth of the package with a three-dimensional map of the storage room.

7. The method of claim 1, further comprising, prior to releasing the package at the second location:
rotating the package to fit in the second location.

8. The method of claim 1, wherein determining a second location within the storage room comprises:
moving, with the robotic arm, a third package within the storage room to create a space for the package.

9. A non-transitory computer-readable medium containing instructions for package manipulation, the non-transitory computer-readable medium comprising instructions for:
providing a package at a first location outside of a storage room that is enclosed on all sides and open on a top;
maneuvering a robotic arm to the first location;
engaging the package with a package engagement mechanism mounted on the robotic arm;
determining a second location within the storage room;
maneuvering the robotic arm to the second location;
releasing the package at the second location;
recording the second location in a memory;
receiving a request for the package;
recalling from the memory the second location in the storage room;
maneuvering the robotic arm to the second location in the storage room;
identifying, by a camera mounted on the robotic arm, a feature of the package;
determining a third location of the package based on the feature;
maneuvering the robotic arm to the third location;
engaging the package with the package engagement mechanism mounted on the robotic arm;
maneuvering the robotic arm to a fourth location outside of the storage room; and releasing the package at the fourth location.

10. The non-transitory computer-readable medium of claim 9, wherein determining a second location within the storage room comprises:
determining a second location based at least in part on a dimension of the package.

11. The non-transitory computer-readable medium of claim 10, wherein the dimension of the package is determined by acquiring an image of the package with the camera and estimating the dimension of the package based on the image.

12. The non-transitory computer-readable medium of claim 9, wherein determining a second location within the storage room comprises:
determining a second location based at least in part on a weight of the package.

13. The non-transitory computer-readable medium of claim 9, wherein determining a second location within the storage room comprises:
comparing a load-bearing capability of a second package beneath the second location with an estimated weight of the package; and
determining that the second package can bear the load of the package based on the comparing.

14. The non-transitory computer-readable medium of claim 9, wherein determining a second location within the storage room comprises:
receiving an estimated height, width, and depth of the package; and
comparing the estimated height, width, and depth of the package with a three-dimensional map of the storage room.

15. The non-transitory computer-readable medium containing instructions for manipulating packages of claim 9, wherein the non-transitory computer-readable medium further comprises instructions for:

prior to releasing the package at the second location, rotating the package to fit in the second location.

16. The non-transitory computer-readable medium of claim 9, wherein determining a second location within the storage room comprises:
moving, with the robotic arm, a third package within the storage room to create a space for the package.

17. An automated warehouse, comprising:
an enclosure, the enclosure open on a top side;
a gantry mounted above the top side of the enclosure, the gantry moveable in a horizontal plane above the enclosure;
an extendable arm movably attached to the gantry, the extendable arm extendable in a vertical direction;
a package engagement mechanism mounted to an end of the extendable arm;
a computer vision system attached to the end of the extendable arm; and
a warehouse controller having a memory,
wherein the warehouse controller is configured to control the gantry, extendable arm, and package engagement mechanism to move a package from outside of the rectangular cuboid enclosure, place the package within the rectangular cuboid enclosure, and record in the memory the location of the package within the rectangular cuboid enclosure.

18. The automated warehouse of claim 17, wherein the package engagement mechanism is capable of rotating in at least one rotational dimension.

19. The automated warehouse of claim 17, wherein the package engagement mechanism uses at least one suction cup and negative pressure to engage packages.

20. The automated warehouse of claim 17, further comprising:
a second extendable arm movably attached to the gantry, the second extendable arm extendable in a vertical direction;
a second package engagement mechanism mounted to the end of the second extendable arm; and
a second computer vision module attached to the end of the second extendable arm.

* * * * *